Nov. 5, 1957     C. A. SMITH     2,812,459
ELECTRIC MOTOR WINDING ARRANGEMENT
Filed July 30, 1956
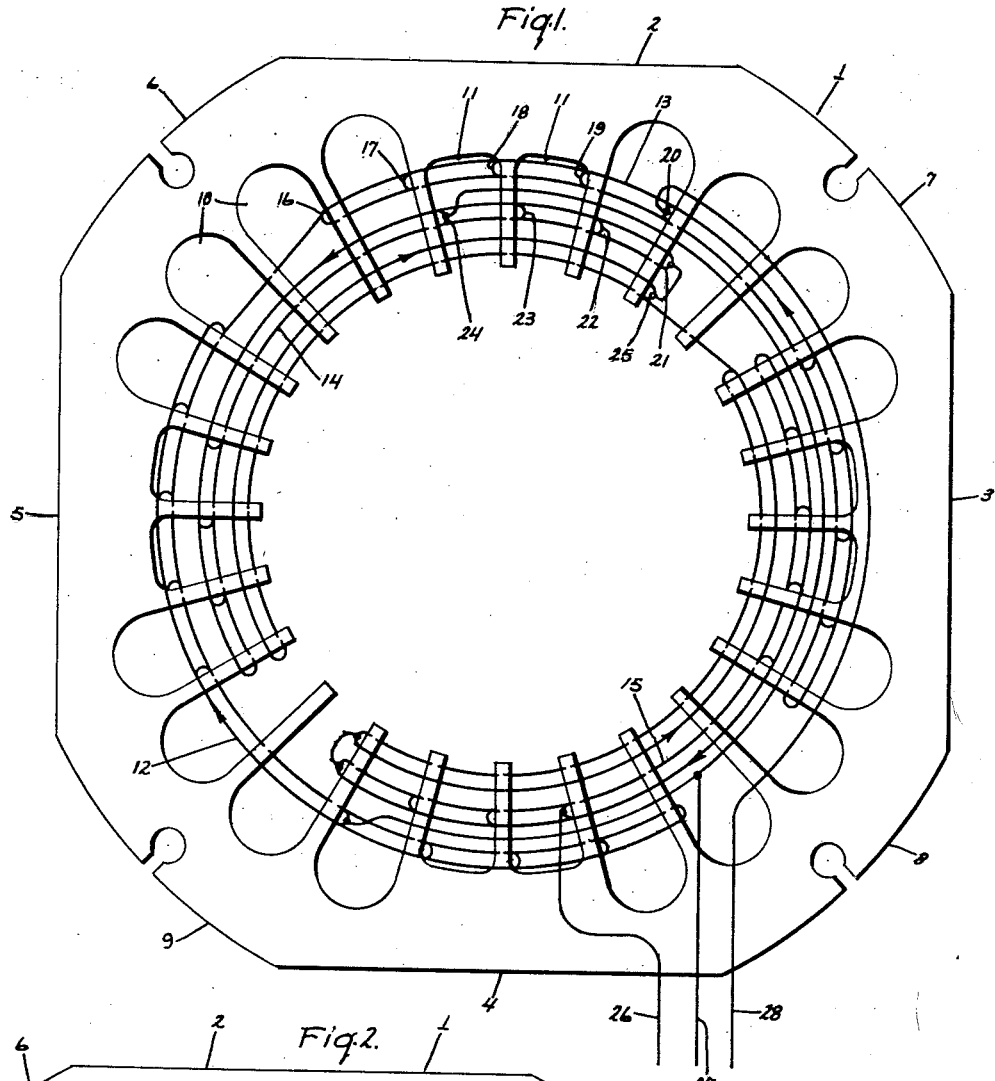
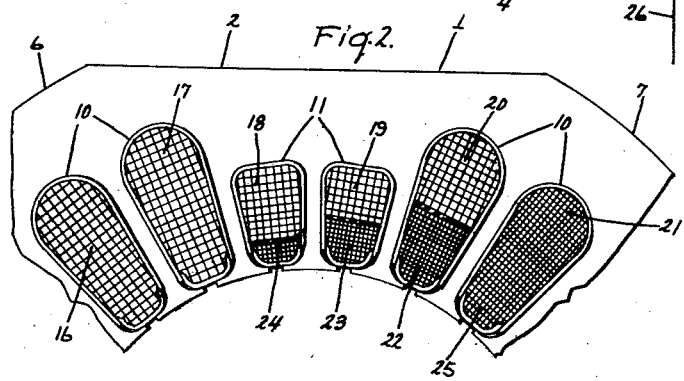
Inventor:
Chester A. Smith,
by *Robert G. Irish*
His Attorney.

United States Patent Office 2,812,459
Patented Nov. 5, 1957

2,812,459

ELECTRIC MOTOR WINDING ARRANGEMENT

Chester A. Smith, Holland, Mich., assignor to General Electric Company, a corporation of New York Application July 30, 1956, Serial No. 600,828

3 Claims. (Cl. 310—198)

This invention relates to electric motors, and more particularly to electric motors of the single phase induction type having distributed two pole main and start windings positioned on the stator.

Single phase induction type electric motors normally include primary and secondary members with the primary member (or stator) carrying a main winding and suitable starting means such as a starting winding, and the secondary member (or rotor) being rotatably mounted concentrically within the stator. While the cross section of the stator member bore must, of course, be circular, it is becoming increasingly common to provide the outer periphery of the stator core with a substantially square cross-section; this achieves savings both as to the amount of room taken up by the motor, and as to the amount of magnetic material required in the making of the stator. Such a stator thus presents a square outer configuration and a circular bore (generally cylindrical), with winding slots extending outwardly from the bore.

If all the winding slots were to be of the same depth, the yoke width between the bottom of each slot and the outside edge of the stator would, of course, be greatly decreased at the center of each side of the square. To remedy this situation, it is necessary to shorten the slots at the center of each side of a square stator. While this provides the desired yoke width at the center of each side, it naturally causes a considerable decrease in the area of the shortened slots.

Hitherto, the use of square punchings has been restricted to four pole motors where each of the four main winding poles could be wound about the shortened slots. In this manner, only the starting winding coils were placed in the shortened slots, and the decreased area caused no difficulty in the proper distribution of either the starting winding or the main winding since the lesser area was adequate for any starting winding coils, and the small slots were not used at all for the main winding coils. However, in the field of refrigeration, where a motor is sealed in with a compressor and the refrigeration system, it is becoming more and more desirable to provide two pole motors because of the increased output which may be obtained from a given size of motor. While the four pole motor had a winding which was completely symmetrical with the stator, this is no longer possible in the case of a two pole motor with a square stator; nonetheless, it is most desirable to retain the square stator configuration for the economies it represents.

When a two pole main winding is introduced into the slots of a square stator core in a manner akin to the placement of the four pole winding, that is, the winding is formed around the shallow slots of one side, the outer coils of the main winding are then positioned in the shallow slots of the two sides adjacent the first side. With such an arrangement, either the number of turns in the outer coil has to be decreased, or else smaller wire has to be used, increasing the running current and the losses. If the first solution is used, then, in order to obtain a sinusoidal wave form of flux distribution, the number of turns of all the other coils of the main winding must also be decreased which consequently decreases the output. If smaller wire is used, the losses and current are undesirably high. It is, consequently, most desirable to provide a distributed winding arrangement for a square stator whereby two pole main and starting windings are provided so as to achieve a substantially sinusoidal running winding flux form while retaining a relatively high number of turns per coil of relatively low-resistance wire.

It is, therefore, an object of this invention to provide an improved two pole induction type motor having a square stator with a high output, low losses, and a flux distribution wave of substantially sinusoidal nature.

The invention relates to a single phase alternating current induction type electric motor which has a slotted stator member with a substantially square configuration. In order to maintain a yoke section of adequate width, the stator member has at least one shallow slot of decreased area substantially at the center of each side.

In the broad aspect of the invention, two pole distributed main and starting windings are arranged in the slots, the main winding having the outermost coil of each pole arranged in slots positioned substantially at two opposite corners of the stator member and the starting winding having the outermost coil of each pole arranged in slots positioned substantially at the other two corners of the stator member. The two windings have relatively inner coils, which have relatively fewer turns of conductor, positioned in the shallow slots.

Thus, by departing from the conventional arrangement of winding the main winding poles around the shallow slots, and by instead moving the winding around 45 degrees and putting small inner coils from both windings in the shallow slots, it is possible to provide a main winding which will have its outermost coil (with the greatest number of turns) positioned in a suitably large slot. In this manner, the greatest use is made of the available slot space, and the highest output possible is obtained from the motor.

The features of the invention which are believed to be novel are set forth with particularity in the appended claims. The invention itself, however, together with further objects and advantages thereof may best be understood by reference to the following description taken in connection with the accompanying drawing.

In the drawing, Figure 1 is an end view of a square stator member provided with the improved winding arrangement of the invention; and Figure 2 is a fragmentary view of a portion of the stator of Figure 1 illustrating the distribution of the windings in the slots.

Referring now to the figures of the drawing, there is shown a stator member 1 of an induction type electric motor which is substantially square in outer configuration with straight sides 2, 3, 4, and 5. The corners 6, 7, 8 and 9 are rounded, as shown, in order to save space and for more economical utilization of magnetic material. It is to be understood that the term "square" as used in this specification, relates to a stator of the type illustrated having four equal sides regardless whether the corners are rounded as shown. Stator 1 is provided with a plurality of slots of two types indicated respectively by the numerals 10 and 11. Slots 10 are relatively deep and with a relatively large area, and are provided in groups of four at the corners where the distance from the bore to the outer edge of the stator is great enough to provide an adequate yoke section (from the bottom of the slot to the outer edge of the stator) even with large slots. However, at the center of each side, in order to preserve an adequate yoke section, it is necessary to provide shortened slots of decreased area as indicated by the numeral 11.

A main winding formed into two distributed poles 12 and 13 is positioned in several of the slots of stator 1 as will be further explained below; a starting winding is also formed into two distributed poles 14 and 15, and is positioned in the slots at 90 electrical degrees from the main winding poles as is customary. It will be understood that a standard motor circuit familiar to those skilled in the art is contemplated and that, therefore, the circuitry of the motor is neither illustrated nor described other than to explain that the windings are adapted to be connected across a source of power by means of conductors 26, 27, and 28. Conductor 27 is the common lead, and conductors 26 and 28 are connected to the starting and main windings respectively.

The improved arrangement of this invention will now be described with particular reference to pole 13 of the main winding and pole 14 of the starting winding, it being understood that the other poles 12 and 15 of the main and start windings respectively are formed similarly to the first two poles in exact opposite relationship. Pole 13 is formed of five concentric coils 16, 17, 18, 19 and 20 which are distributed in the slots with differing numbers of turns of conductor in each, the objective being to achieve as close to a sinusoidal wave form for the flux distribution in the winding pole as is practically possible. While the precise relationship of the number of turns of each coil differs with different motors, it is consistently necessary to provide more turns in the outer coils than in the inner coils. The same general situation holds true for the starting winding, where pole 14 is provided with four concentric coils 21, 22, 23 and 24. In addition, the starting winding may be provided with an additional number of turns 25 in the outermost coil, the additional turns being known as a "backlash" winding, and constituting a commonly used means of improving the starting characteristics of the motor. The "backlash" winding does not constitute a part of this invention other than insofar as its space requirements must be considered together with those of the starting winding because it is arranged in the same slots as the outermost coil of the starting winding.

Instead of the conventional winding arrangement for square stators where the main winding poles are each arranged concentrically about the small slots 11, the present invention contemplates the placement of outer coils 16 and 17 of the main winding pole 13 in large slots 10 at opposite corners 6 and 8 of the stator 1. The two remaining slots 10 in those corners are, of course, occupied by the corresponding coils of main winding pole 12. Thus, by moving the main winding 45 degrees from its conventional position, the outermost coil and the second outer coil, which require the most room because of their large number of turns, are in large slots.

In similar fashion, starting winding pole 14 has its outermost coil 21 and its second outer coil 22 both positioned in relatively large slots, the second outer coil being in the same slot as the innermost coil 20 of the main winding. Since, again, the outer coils are the ones having a relatively great number of turns, it is seen that these fall in larger slots by the positioning of the windings 45 degrees from their conventional position. Of course, in the case of the starting winding, the space factor is not as critical since the winding is formed of relatively fine wire to provide a high resistance while the main winding is formed of relatively large wire to provide a low resistance. However, in the case of both windings, it is most desirable to have the outer coils with the higher number of turns positioned in the larger slots, and this is achieved by the provisions of the invention. With the arrangement described above, one slot 11 receives coil 18 of the main winding and coil 24 of the starting winding, and the other slot 11 receives coil 19 of the main winding and coil 23 of the starting winding. In all four cases, the coils are relatively inner ones with relatively few turns and thus can be placed in a smaller space without sacrifice.

To help provide complete understanding of the invention, a specific example is given below.

An induction motor having a stator outer diameter of 5.48 inches (corner to corner) and a bore diameter of 2.65 inches was provided with main and starting two pole windings in the manner described above. It had previously been determined that a desirable turns distribution to approximate a sinusoidal flux wave would be as follows:

| | Turns |
|---|---|
| Coil 16 | 41 |
| Coil 17 | 39 |
| Coil 18 | 33 |
| Coil 19 | 26 |
| Coil 20 | 16 |

When an attempt was made to insert such a winding arrangement with .0403 inch diameter wire (a standard for main windings in small motors) in the conventional manner, the outermost coil 16 could not be fitted into the slot 11 in which it would normally be located. Consequently, if the conventional winding arrangement had been used, it would have been necessary either to decrease the number of turns in the outermost coil or to decrease the wire size. However, with the arrangement of the invention, the sinusoidal wave form was approximated by the following coil distribution using the standard above mentioned wire:

| | Turns |
|---|---|
| Coil 16 | 41 |
| Coil 17 | 38 |
| Coil 18 | 28 |
| Coil 19 | 27 |
| Coil 20 | 18 |

It will be seen from the foregoing that the distribution approaches quite closely to that needed for an approximation of a flux sine wave. The only material departure lies in the third coil 18 which lies within a slot 11 and which has been decreased from 33 to 28 turns; however, the number of turns is still lower than that of the next outer coil and higher than that of the next inner coil. In addition, it is possible to modify slightly the number of coils in the other slots so as to return even closer to the sinusoidal distribution. Thus, it will be observed that the number of turns in the inner coils has been slightly increased and that the number of turns in the next outer coil 17 has been slightly decreased. The overall number of coils has been decreased only by three, and the important outer coil containing the biggest number of turns has remained the same as before. This desirable effect has been achieved without any reduction being required in the wire size.

As to the starting winding, the ideal practical design included the following numbers of turns:

| | Turns |
|---|---|
| Coil 21 | 39 |
| Coil 22 | 36 |
| Coil 23 | 31 |
| Coil 24 | 24 |

Backlash winding 25—33 turns forward, 33 turns back.

When the windings were arranged in the improved construction of this invention, the following distribution was provided:

| | Turns |
|---|---|
| Coil 21 | 42 |
| Coil 22 | 37 |
| Coil 23 | 32 |
| Coil 24 | 18 |

Backlash winding 25—33 turns forward, 33 turns back.

It can be seen that the only material decrease in number of turns comes in the innermost coil where there are 18 turns instead of 24 as previously designed. However, again this change has been offset by slight modifications in the number of turns in the other coils, so that the flux wave shape provided is substantially sinusoidal. The number of turns in the starting winding pole actually is only one less than previously designed and, again, the important outer coil has not been depleted by any turns.

Thus, there is a total of only four fewer turns in both winding poles and the outer coils have retained all their turns, which is particularly important in the case of the main winding. This was achieved despite the fact that the two pole windings were provided in a stator having eight slots 11 with an area of 132,000 circular mils each as opposed to the 170,000 circular mils of each of the larger slots 10. This represents 22 percent less area in the smaller slot and, when a conventional winding approach was used, precluded the effective use of slot space provided by the present invention.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a single phase alternating current induction type electric motor, a stator member having equally spaced slots formed therein and a substantially square configuration, said member having a shallow slot of decreased area relative to the other slots substantially at the center of each side to maintain a yoke section of adequate width in said stator member, and two pole distributed main and starting windings arranged in said slots, said main winding having the outermost coil of each pole arranged in slots positioned substantially at two opposite corners of said stator member, said main winding having inner coils with relatively few turns of conductor positioned in said shallow slots.

2. In a single phase alternating current induction type electric motor, a stator member having equally spaced slots formed therein and a substantially square configuration, said member having a shallow slot of decreased area relative to the other slots substantially at the center of each side to maintain a yoke section of adequate width in said stator member, and two pole distributed main and starting windings arranged in said slots, said main winding having the outermost coil of each pole arranged in slots positioned substantially at two opposite corners of said stator member, said starting winding having the outermost coil of each pole arranged in slots positioned substantially at the other two corners of said stator member, the poles of said windings having inner coils with relatively few turns of conductor positioned in said shallow slots.

3. In a single phase alternating current induction type electric motor, a stator member having equally spaced slots formed therein and a substantially square configuration with a pair of shallow slots of decreased area relative to the other slots located at the center of each side to maintain a yoke section of adequate width in said stator member, and two pole distributed main and starting windings arranged in said slots, said main winding having the outermost coil of each pole arranged in slots positioned substantially at two opposite corners of said stator member, said starting winding having the outermost coil of each pole arranged in slots positioned substantially at the other two corners of said stator member, the number of turns per coil for said windings increasing from the innermost coil of each pole of said windings to the outermost coil thereof thereby to approximate a flux sine wave upon energization of the windings, each of said windings having two relatively inner coils of relatively few turns of conductor positioned in each of the two shallow slots on each side of said stator member.

References Cited in the file of this patent

FOREIGN PATENTS

| 694,327 | Germany | July 30, 1940 |
| 697,031 | Germany | Oct. 5, 1940 |
| 50,563 | Netherlands | June 16, 1941 |
| 144,777 | Australia | Jan. 16, 1952 |